May 20, 1969 H. R. SMITH ET AL 3,445,295
AMMONIA BATTERY

Filed Sept. 30, 1966 Sheet 1 of 2

INVENTORS:
HOLLEY R. SMITH
BERNARD P. SYKES
BY Howson & Howson
ATTYS.

May 20, 1969  H. R. SMITH ET AL  3,445,295
AMMONIA BATTERY
Filed Sept. 30, 1966  Sheet 2 of 2
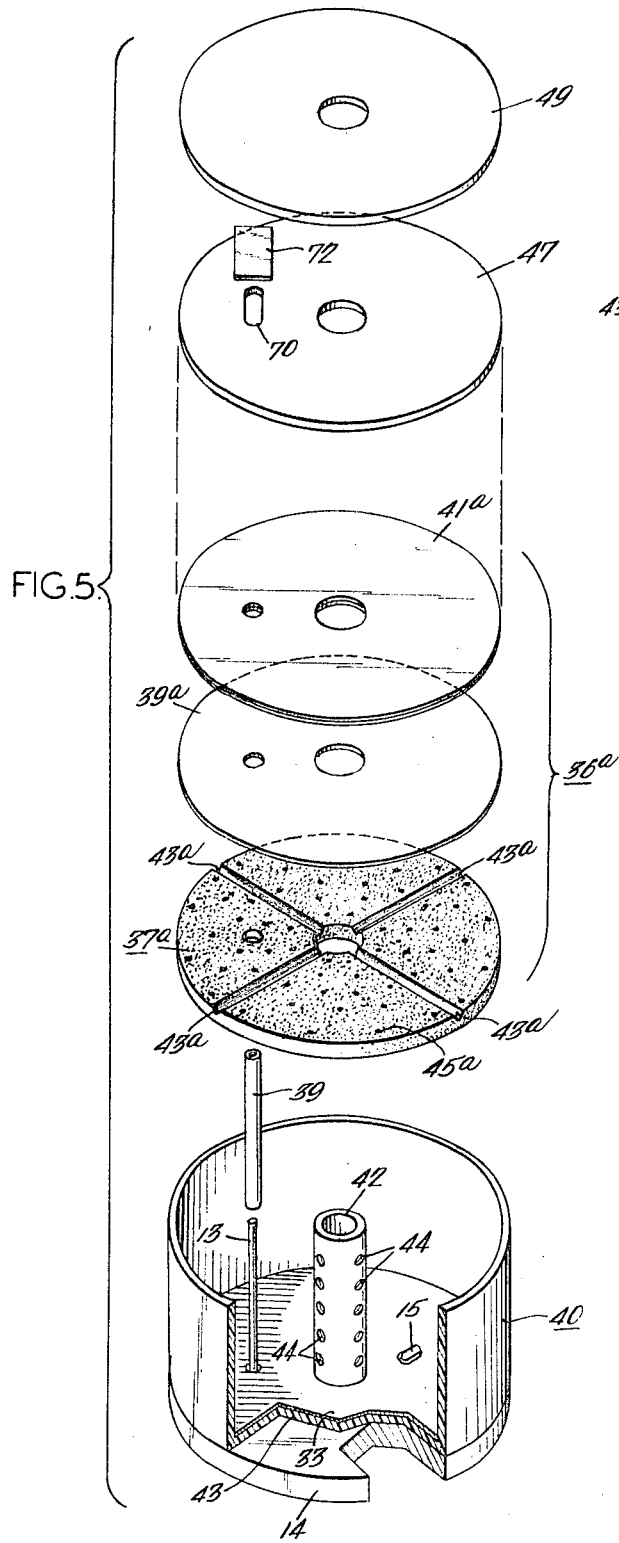
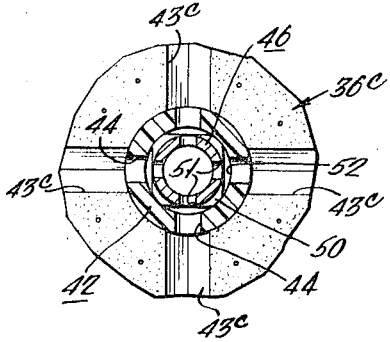
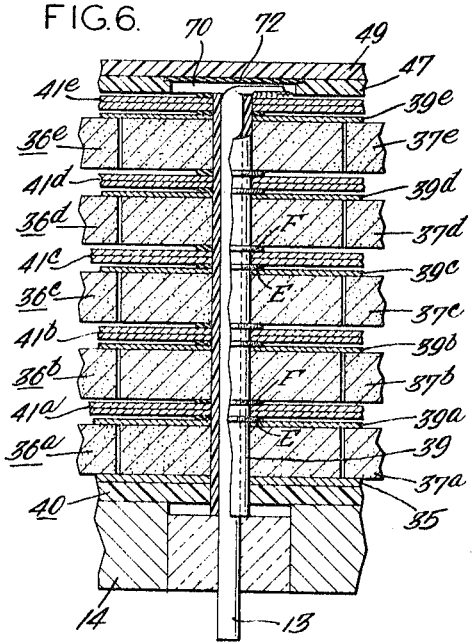
INVENTORS:
HOLLEY R. SMITH
BERNARD P. SYKES
BY Howson & Howson
ATTYS.

United States Patent Office 3,445,295
Patented May 20, 1969

3,445,295
AMMONIA BATTERY
Holley R. Smith, North Wales, and Bernard P. Sykes, West Chester, Pa., assignors, by mesne assignments, to Honeywell Inc., Minneapolis, Minn., a corporation of Delaware
Filed Sept. 30, 1966, Ser. No. 583,346
Int. Cl. H01m 17/00
U.S. Cl. 136—90                                5 Claims

ABSTRACT OF THE DISCLOSURE

A deferred-action electro-chemical battery wherein inter-cell leakage is minimized. The individual cells of the battery are sealed from each other so that no electrolyte flow between the cells is possible except via a central stem through which the electrolyte is delivered to the cells for energizing the battery.

---

The present invention relates generally to an ammonia battery system and more particularly to a reserve liquid ammonia fuse battery.

Batteries of this type generally comprise an activator section including a reservoir for a quantity of activator fluid such as liquid ammonia and a battery section comprised of a plurality of dry cells. The activator section is usually separated from the battery section by means of a bulkhead having a thin membrane which is pierceable by a lance carried by a flexible inverted cup member to permit flow of the activator fluid into the battery section to activate the battery. In some of these batteries, the cells are circular in configuration and are stacked in a column and the activator fluid discharges through a hollow chamber in the battery section disposed centrally of the cells to saturate the various cells with the activator fluid.

These prior battery systems have certain disadvantages and drawbacks. For example, it has been found upon activation of the battery section there is an undue amount of intercell activity producing intercell shorts which result in wasted energy and noisy electrical output. Additionally, it has been found that there is an uneven distribution of the activator fluid in the cells so that the time delay between the activation and full discharge of the battery varies and is unpredictable, this being an important factor in batteries of this type since they are used primarily in applications where the precise time of activation must be accurate and the period of activation must be predictable. Additionally, it has been found that in these prior batteries, high pressures are required to actuate the battery section which, of course, means that the casing has to be of a predetermined weight and thickness to withstand the pressures and sealing of the casing becomes a critical factor.

The present invention provides an improvement in batteries of this type which is characterized by novel features including means for isolating the cells and also means for insuring good distribution of the activator fluid in the cells. Thus, with the battery of the present invention there is a shorter and more consistent activator time and complete activation is assured to provide a consistently predictable output. Furthermore, in accordance with the present invention, the battery may be activated by a substantially lower pressure and thereby making it possible to use a lighter casing or outer shell and hence the entire assembly is much lighter and cheaper to make. Additionally, it is noted that for a comparative size battery, the battery of the present invention provides at least a 50% increase in life.

With the foregoing in mind, an object of the present invention is to provide a deferred action type battery including novel features of construction and arrangement providing isolation of the cells to minimize intercell activity and means for insuring complete saturation of the cells upon activation of the battery.

Another object of the present invention is to provide a deferred action type battery which is of comparatively lightweight construction, durable and extremely economical to make.

A further object is to provide a deferred action type battery which has a substantially increased life and a shorter more consistent activation time and a more complete consistent output.

These and other objects of the present invention and the various features and details of the operation and construction thereof are hereinafter more fully set forth with reference to the accompanying drawings, wherein:

FIG. 4 is an enlarged fragmentary sectional view through the center post taken on line 4—4 of FIG. 3;

FIG. 5 is an exploded perspective view of the cup and cell assembly of the battery section; and FIG. 6 is an enlarged sectional view taken on line 6—6 of FIG. 2.

Figure 1:
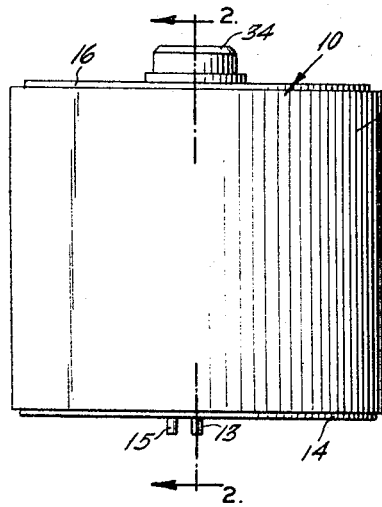
FIG. 1 is an elevational view of a liquid ammonia deferred action type battery incorporating the present invention.
Figure 2:
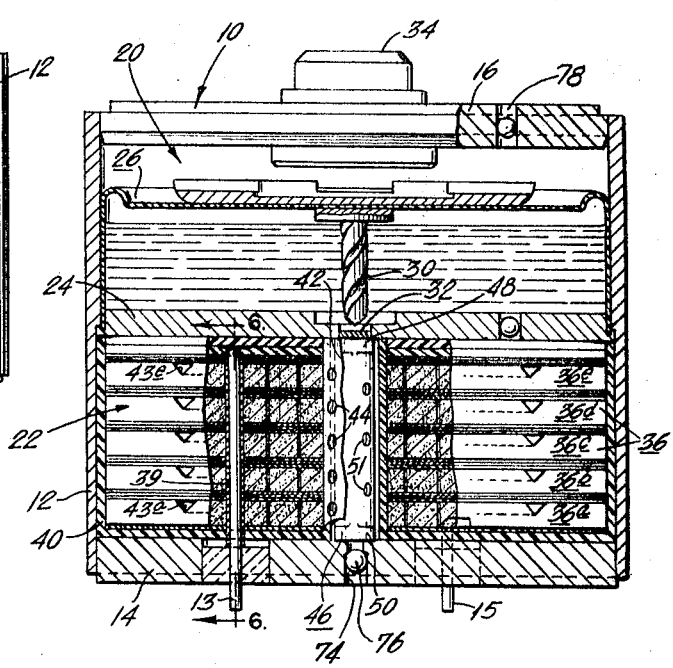
FIG. 2 is an enlarged vertical sectional view taken on lines 2—2 of FIG. 1.
Figure 3:
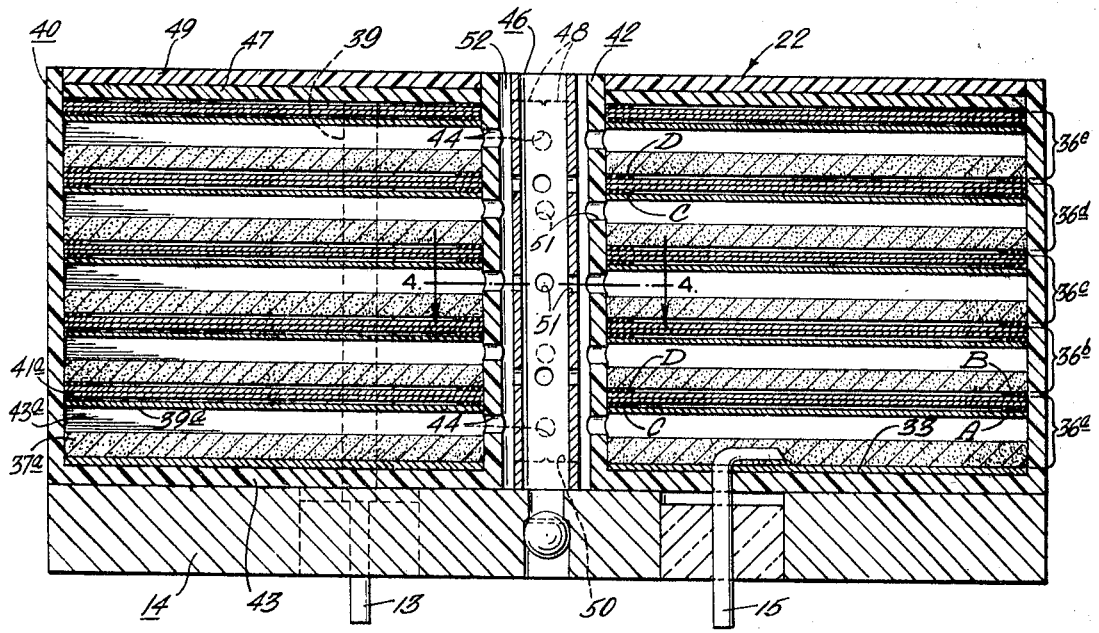
FIG. 3 is an enlarged vertical section through the battery compartment of the battery.

Referring now to the drawing and particularly to FIGS. 2 and 3 thereof, the battery designated by the numeral 10 includes a generally cylindrical outer shell or housing 12 enclosed at one end by a terminal plate 14 and at its opposite end by a top cover member 16. The battery 10 includes an activator section 20 and a battery section or compartment 22 which are separated by a bulkhead 24 disposed approximately centrally of the axial ends of the shell or housing. The battery 10 includes positive and negative leads 15 and 13 respectively, the terminal ends of which are supported in the terminal plate 14 by means of ceramic plugs so that they depend below the plate as illustrated in FIG. 2.

The activator section 20 includes an inverted cup-shaped member 26 formed of steel which, as illustrated, is secured at its outer peripheral lower edge adjacent the bulkhead 24 to form a sealed reservoir for an activator fluid such as liquid ammonia or other electrolyte solution. The top wall of the activator cup 26 mounts a depending drill lance 30 aligned with a thin walled area 32 of the bulkhead 24. The lance 30 upon actuation downwardly pierces the thin wall area 32 which constitutes a rupturable membrane to release the activator fluid from the activator section 20 and permit it to enter the battery section 22. Conventional means may be employed for activating the lance 30 and may consist for example of a chemical propellant or gas generator admitted through an activating mechanism 34 in the top cover 16. This activating mechanism 34 which may be of a known type shown, for example, in Patent No. 3,239,385, is generally in the nature of an electric match comprising a disc of easily ignitable material activatable by means of a suitable source of electrical energy to ignite the disc and another disc of moderate rate chemical propellant or gas in contact with the ignitable disc thereby to generate a gas upon activation. This activation takes place when it is desired to use the battery whereby gas will be generated at a predetermined rate filling the entire compartment above the top surface of the activator cup. During build up of pressure in this compartment by the gas, the force of the expanding gas will urge the upper end of the activator cup downwardly and drive lance 30 through the thin area membrane 32. By this action, the activator fluid from the activator cup 26 is positively displaced through the ruptured membrane 32 and into the battery compartment 22, thereby to activate the battery until such time as the pressure in the battery compartment equalizes the pressure of the activator cup. This results in continued operation and efficiency of the battery regardless of the attitude of the battery or the carrying vehicle.

Considering now the details of the battery section 22, this section comprises a plurality of dry charged cells generally designated by the numeral 36, in the present instance of circular-disc form mounted in superimposed relation as illustrated in the drawings. In the illustrated embodiment there are five cells 36a, 36b, 36c, 36d and 36e. The cells are mounted in a cup-member 40 which may be made of polypropylene and which is secured at its lower face to the terminal plate 14 by suitable means. The cup 40 has a centrally disposed tubular stem 42 having in the present instance five sets of radial ports 44 aligned with each of the cells of the cell stack, the stem 42 being formed integrally with the base 43 of the cup. Each set of ports, as illustrated in FIG. 4, comprises four circumferentially equispaced openings. A hollow support column 46 is mounted centrally of the hollow stem 42 of the cup 40 which, as best illustrated in FIGS. 3 and 4, for the major part of its length is generally cylindrical and has at its outer ends enlarged upper and lower terminal portions 48 and 50, which snugly engage the inner periphery of the stem to locate the support column centrally of the stem and define an axially extending elongated manifold 52 between the support column and the stem. This support column also has a plurality of radial openings 51 to facilitate flow of activator fluid from interiorly of the support column 46 to the manifold 52. By this arrangement, when the activating mechanism is set up to generate gas in the activator section, the lance 30 is displaced downwardly to pierce the membrane 32 whereby activator fluid flows under pressure into the center opening of support column. The activator fluid then discharges through the ports in the support column to the manifold area surrounding the support column and from there into the cells through openings 44 in the stem 42 of the cup 40.

The cell stack subassembly as best illustrated in FIG. 3 includes a cathector disc 33 mounted in the cup 40 in overlying relation to the wall thereunder to which the terminal end of the positive lead 15 is attached, for example, by means of soldering. The five dry cells 36a–36e are mounted in superimposed relation on the cathector. All of the cells of the stack are identical in construction and accordingly, similar part numbers are assigned thereto differing only in the letter subscript. Thus, the bottom cell 36a comprises a cathode 37a, a separator 39a and a bimetallic anode 41a. The lead 13 is secured, for example by soldering, to the face of the anode 41c of the top cell 36e of the cell stack. A pair of plastic discs 47 and 49 are heat sealed to the upper terminal edge of the cup 40 to complete the cell stack assembly.

In the present instance various elements of the cell stack subassembly are sealed to minimize intercell activity upon activation of the battery section 22. More specifically, as illustrated in FIG. 3, a sealing bead or fillet A of suitable rubber cement is placed between the separator and anode of each cell and a bead or fillet B of rubber cement is placed between the anode and cathode of adjacent cells at their outer peripheral edge adjacent the side wall of the cup 40. Sealing beads or fillets C and D of rubber cement also separate the separator and anode of each cell and the anode and cathode of adjacent cells at the inner peripheral edge of the cells adjacent the center stem 42 of the cup 40. Sealing beads or fillets E and F of rubber cement are disposed at the same locations surrounding the jacket covering the negative lead 13.

Another feature of the present invention is the provision of means for insuring complete saturation of the cells when the battery section is activated. To this end, each of the cathodes, for example the cathode 37a of the bottom cell, is provided in the present instance with four radially extending circumferentially equispaced grooves 43a in the upper face thereof which communicate at their inner terminal ends with the ports 44 in the center stem (see FIG. 4). Additionally, the upper face of each cathode is punctured, for example as at 45a upon assembly to provide a porous structure. By this arrangement, when the activator fluid flows into the manifold 52 and through the ports 44, the entire cell is uniformly saturated.

Consider now the assembly of the battery and more particularly the assembly of the cell stack subassembly. The cup 40 is secured to the terminal plate 14, in the present instance, by scoring the bottom face of the cell cup to provide a roughened surface and then applying a primer on the scored bottom face of the cell cup and the upper face of the terminal plate. After suitable drying time has elapsed, a quantity of cement is applied around each of the glass terminal plugs supporting the leads 13 and 15 and the entire surface of plate 14.

The insulator jacket is then placed over the negative lead 13 with the bottom thereof immersed in the cement. The center plug is then inserted into the central opening of the terminal plate. The cell cup 40 is then aligned with the terminal plate 14 and placed on a clamping fixture for a predetermined period to allow the parts to dry.

The cell stack assembly is now inserted into the cup first by aligning the cathector 33 with the leads 13 and 15 and center stem 42 and gently pressing it into position with a seating tool. The positive lead is then cut to approximately $3/16$ inch length and bent so that it engages the cathector and soldered in place. The cathode 37a for the first cell 36a is then placed groove side up over the negative lead and center stem and gently pressed into position with the seating tool. The center stem 42 is then pierced at four circumferentially spaced locations to provide the first group of ports 44 aligned with the grooves 43a in the cathode to provide direct fluid communication with the manifold 52. The upper face of the cathode is then perforated by a suitable piercing tool. Approximately 15 holes are punched in each quadrant of the cathode. The separator 39a is then placed over the wire and stem and gently pressed into position. Continuous fillets of rubber cement A, C, and E are then placed between the paper separator and cup wall and also around the center stem and wire.

Thereafter, the anode 41a is placed over the separator with the magneisum face down confronting the separator and gently pressed into position. Continuous fillets or beads B, D and F of rubber cement are applied between the outer periphery of the silver face of the anode and the cell wall around the center stem and negative lead. The remaining four cells are assembled in the same manner described above. After the anode for the top cell 36e is assembled, the jacket 39, which may be made of Teflon, is cut approximately $1/16$ inch above the anode and the wire is cut approximately $3/16$ inch above the upper face of the anode. The wire is then bent and soldered in place and the soldered connection covered with rubber cement. The inner cover 47 is then placed over the open end of the cup 40 so that the slot 70 overlies the soldered terminal end of the negative lead and then gently pressed into position. A small strip of mica 72 is placed over the slot and the outer end cover 49 is then pressed into position. The end covers 47 and 49 are then heated to effect a seal between the center stem and the end covers and also between the outer periphery of the cup and the end covers. The side wall projecting above the end caps is then trimmed. The support column 48 is then pressed into place with the openings 51 preferably aligned with the ports in the center stem.

Before assembling the cell stack subassembly to the battery, the various parts comprising the activator section are put together. Thus, the inverted cup 26, bulkhead 24 and cup cover 16 are assembled to the cylindrical casing 12 in the arrangement shown in FIG. 2. Thereafter, the reservoir formed by the cup 26 is filled with an activating fluid, for example, liquid ammonia or other electrolyte solution. To this end, a port 70 is provided in the bulkhead 24 which is sealed, in the present instance by means of a ball plug 72. The cell stack subassembly is then positioned interiorly of the bottom open end of the casing 12 so that it abuts the bottom of the bulkhead and in this position the terminal plate 14 and lower edge of the casing are secured together for example by means of a spinning process. The terminal plate 14 is provided with a centrally located vent opening 74 sealed by a ball type plug 76. This arrangement provides for access into the interior of the battery compartment for purposes of partially or completely evacuating air therefrom, etc. A plugged vent hole 78 is also provided in the top plate for evacuating the space between the top plate 16 and cup 26.

While a particular embodiment of the present invention has been illustrated and described herein, it is not intended to limit the invention to such disclosure and changes and modifications may be made therein within the scope of the following claims.

We claim:

1. In a deferred-action electro-chemical battery, an enclosed cell casing having an activator section and a battery compartment, a bulkhead separating the activator section and the battery compartment including a pierceable membrane whereby electrolyte from the activator section may be admitted into the battery compartment, the battery compartment comprising:

a cup member having a central hollow stem extending from the pierceable membrane in said bulkhead to the other side of the battery compartment;

a plurality of dry cells or disc-like form each having a central hole corresponding in size to the cross-sectional area of said stem, mounted in said cup member around said stem;

sealing means between each of said cells at the outer perimeter adjacent the cup wall and the inner perimeter adjacent the central stem; and said central stem further having a plurality of radial ports, at least one of said ports being aligned with each of said cells and providing a passage for the electrolyte to said cell, whereby no electrolyte flow between the cells is possible except through said central stem, thereby minimizing intercell leakage.

2. A battery as claimed in claim 1 wherein each of said cells includes a cathode having a plurality of radially directed grooves in one face thereof and wherein said center stem includes a plurality of ports aligned with said grooves to insure complete saturation of the cells.

3. A battery as claimed in claim 2 wherein the cathode has a plurality of perforations therein.

4. A battery as claimed in claim 1 wherein each of said cells comprises a cathode, a separator and an anode and wherein the sealing means is in the form of a fillet adjacent the outer and inner peripheral edges of the cells between the separator and anode of each cell and between the anode and cathode of adjacent cells.

5. A battery as claimed in claim 4 wherein said fillets are rubber cement.

References Cited

UNITED STATES PATENTS

| | | | |
|---|---|---|---|
| 2,847,494 | 8/1958 | Jeannin | 136—90 |
| 2,852,592 | 9/1958 | Salauze | 136—90 |
| 3,022,365 | 2/1962 | Saurwein | 136—90 |
| 3,100,164 | 8/1963 | Solomon et al. | 136—90 |
| 3,173,808 | 3/1965 | Himy et al. | 136—133 |
| 3,332,804 | 7/1967 | Zaromb | 136—90 |

WINSTON A. DOUGLAS, *Primary Examiner.*

C. F. LE FEVOUR, *Assistant Examiner.*

U.S. Cl. X.R.

136—100